United States Patent Office 2,763,137
Patented Sept. 18, 1956

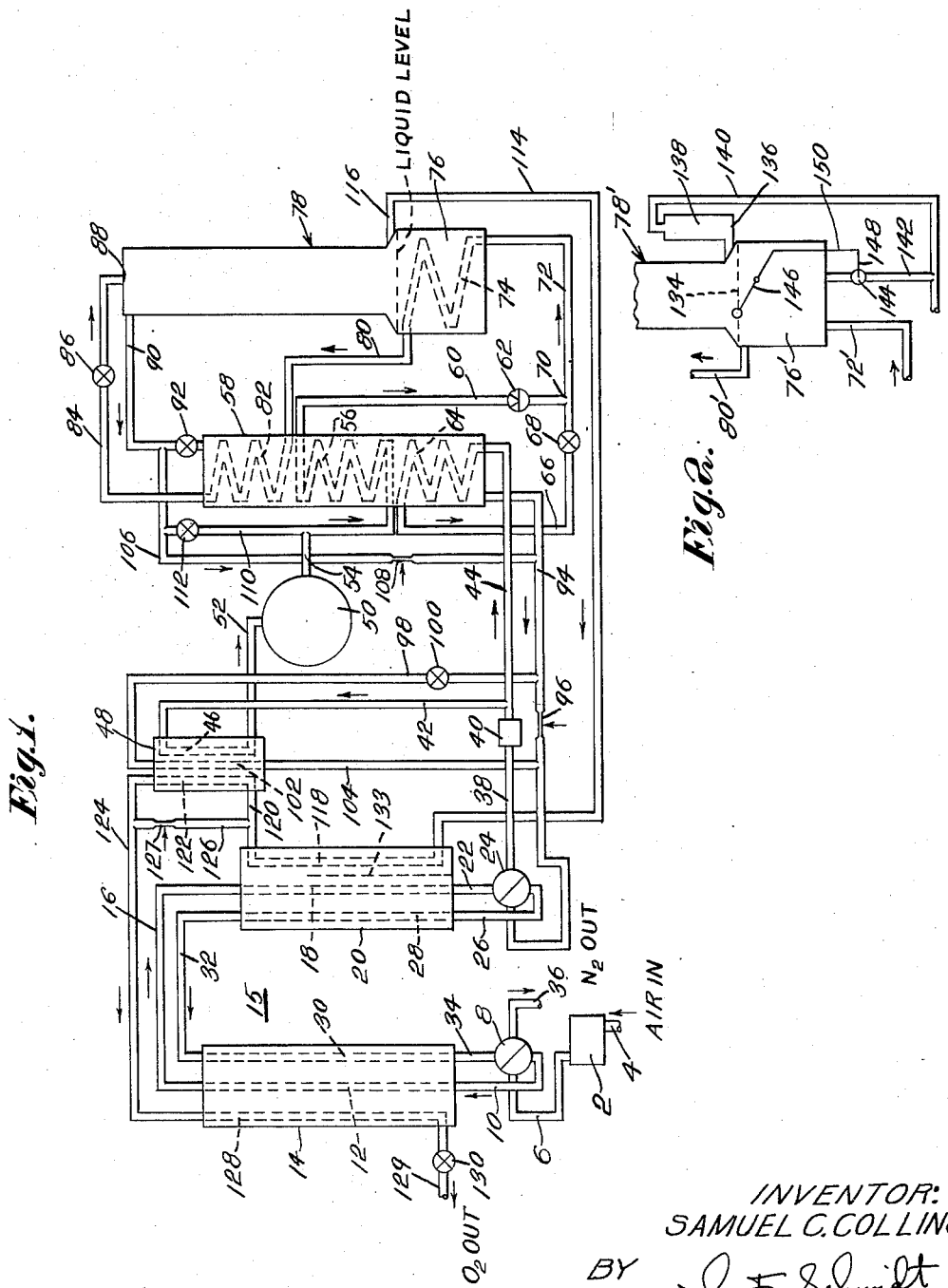

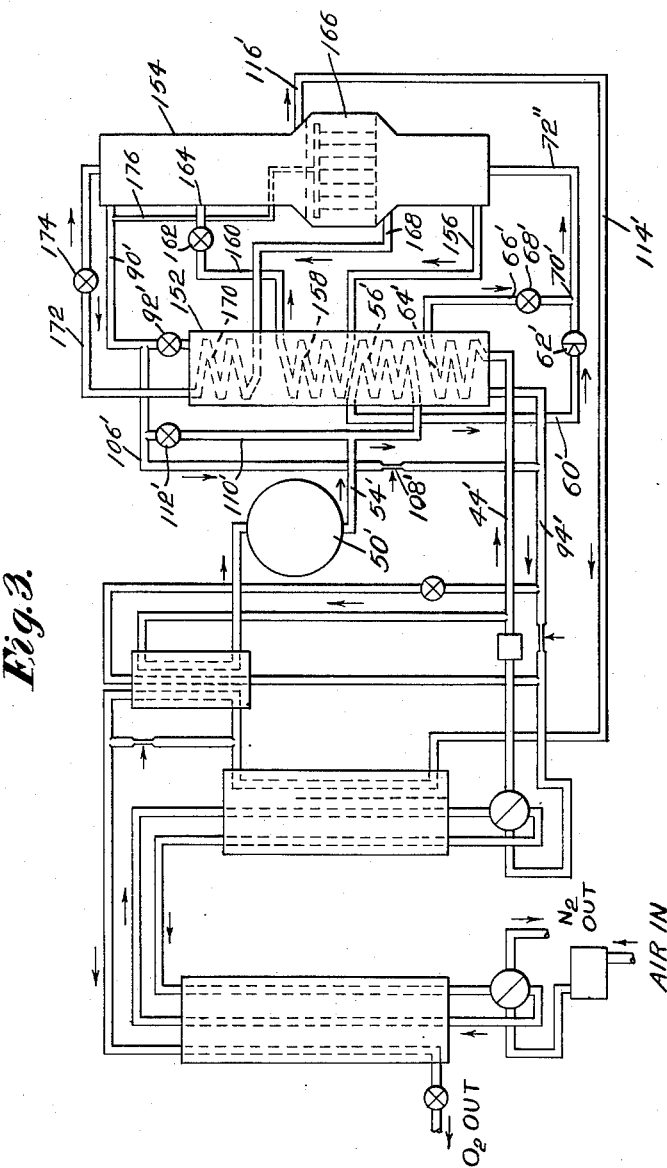

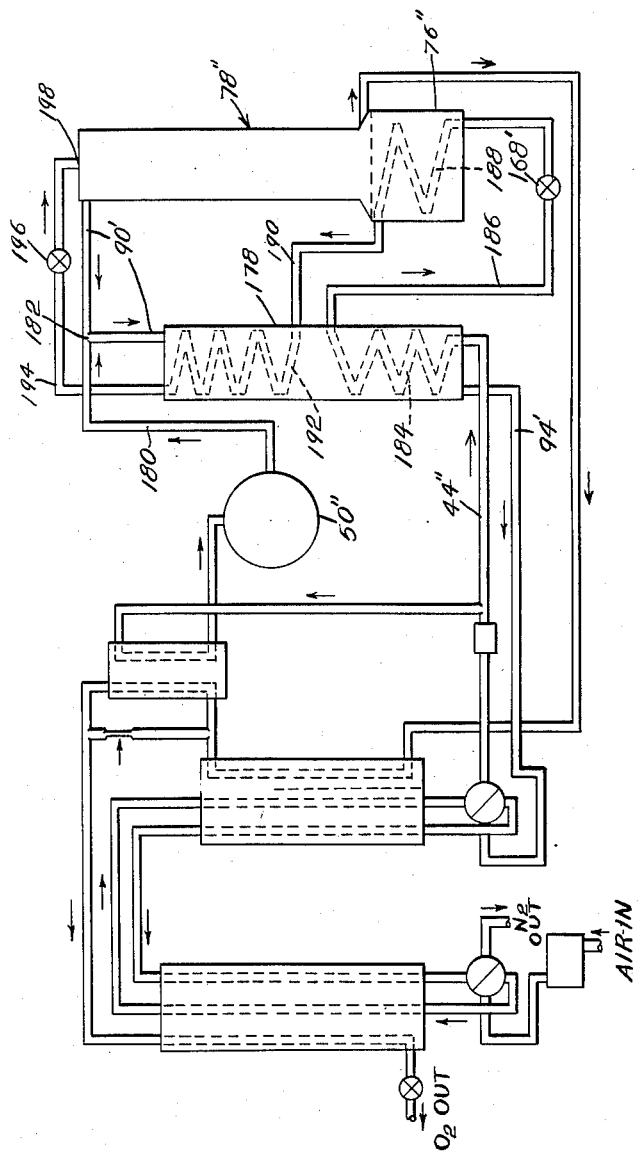

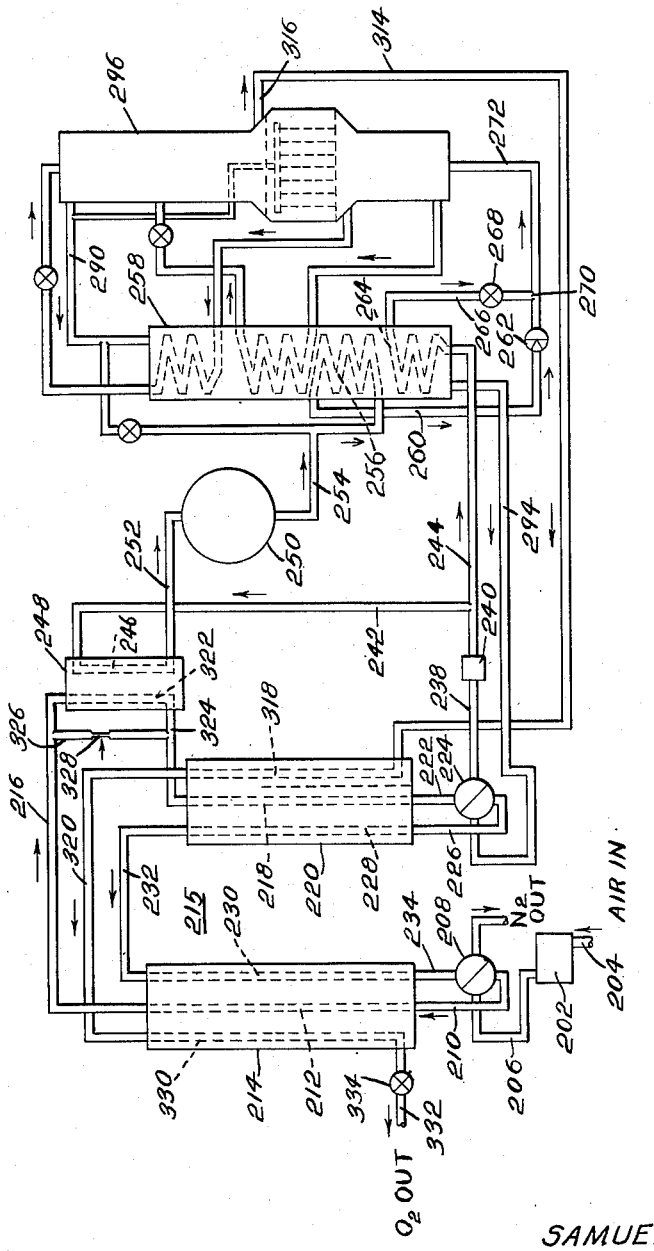

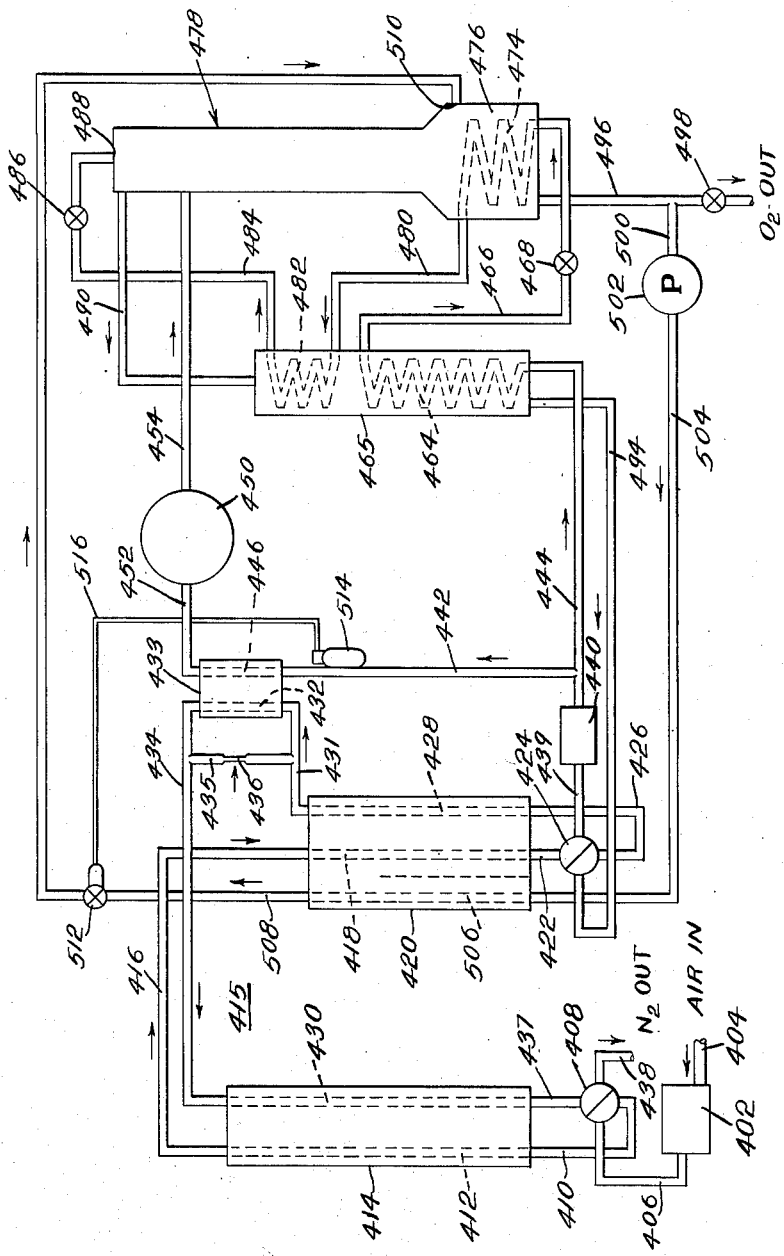

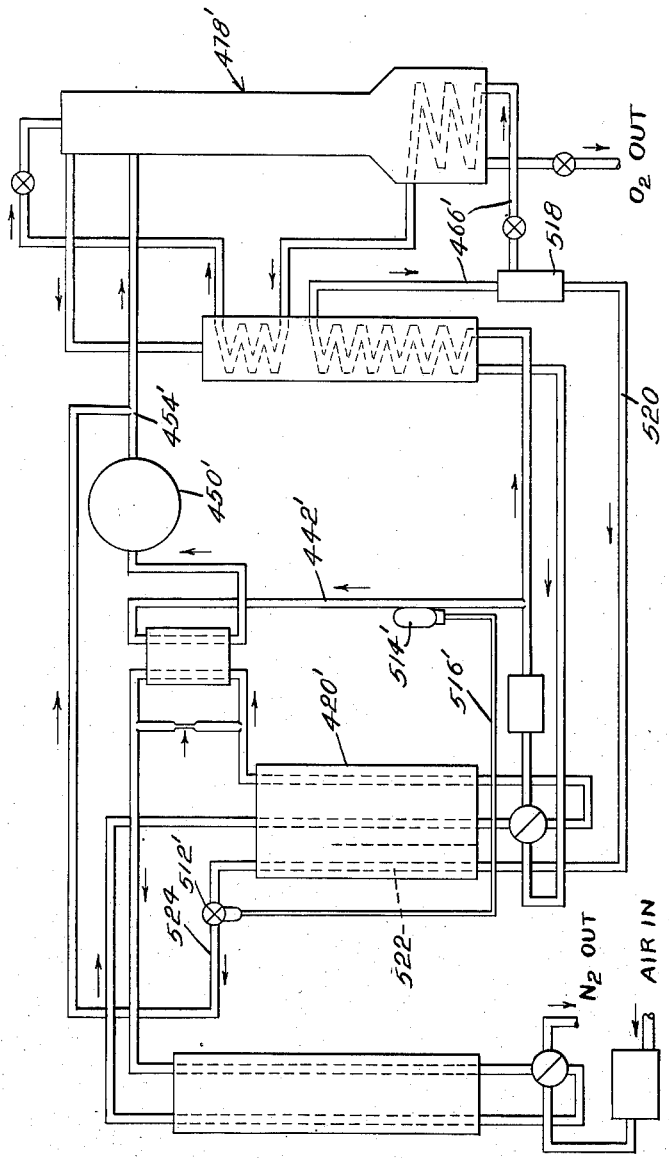

2,763,137

APPARATUS FOR AND METHOD OF SEPARATING GASES

Samuel C. Collins, Watertown, Mass., assignor to Joy Manufacturing Company, Pittsburgh, Pa., a corporation of Pennsylvania Application July 10, 1951, Serial No. 236,014

11 Claims. (Cl. 62—123)

This invention relates to apparatus for and a method of separating oxygen from the remaining constituents of air.

To separate oxygen from the remaining constituents of air, it has been found advantageous to accomplish the separation at low temperatures in order to take advantage of the different boiling points of oxygen and the remaining constituents, mostly nitrogen. The separation is accordingly accomplished by rectification at temperatures which are far below atmospheric. Working at these temperatures raises certain problems because the working temperatures are far below the condensing temperatures for the impurities in the air, these impurities being mostly water and carbon dioxide. It accordingly becomes necessary to remove the impurities from the air before the air is rectified in a rectification column.

Various methods of removing impurities from the air have been devised, but one that has found considerable favor of late among those skilled in the art involves the use of reversing heat exchangers, in which the compressed air and a product of the rectification, usualy nitrogen and the remaining constituents, pass through separate passages in a heat exchanger for a given time, during which time the impurities (mostly water and carbon dioxide) solidify and deposit on the walls of the passage or passages through which the compressed raw air is passing, while the nitrogen and other constituents pass through another passage or passages in the heat exchanger. After a predetermined interval, the compressed raw air and the nitrogen effluent interchange passages in the reversing heat exchanger, so that the compressed raw air passes through the passage in the heat exchanger which was just occupied by nitrogen effluent, and the nitrogen effluent now passes through the passage in the heat exchanger through which the compressed air has just passed. As a consequence, the nitrogen effluent removes the condensed impurities from the walls of the passage through which it is flowing.

There is a conflict of engineering or thermodynamic principles which complicates the design of a successful device, and the operation of a successful method. The conflict referred to lies in the fact that it is desirable to cool the ingoing raw compressed air to as low a temperature as possible in the reversing heat exchanger in order to secure a maximum of removal of the impurities referred to. At the same time, it is desirable to have the nitrogen effluent going out through the reversing heat exchanger enter its passage at as high a temperature as possible in order that there may be complete removal of the impurities from the passages in the reversing heat exchanger. Thus the cooling of the air to the lowest possible temperature makes it desirable to have the nitrogen enter the reversing heat exchanger at a low temperature, whereas the complete removal of the solidified impurities by the nitrogen effluent makes it desirable to have the nitrogen effluent enter the reversing heat exchanger at a high temperature.

This conflict of principles is resolved in my invention by the apparatus and method described herein and claimed in the claims appended to the description. In this invention, the necessary refrigeration to cool the air down to the desired low temperature for solidification or removal of substantially all impurities, is derived in part from a cold fluid, other than nitrogen effluent, taken from the system. The nitrogen effluent meanwhile is preliminarily heated to a desired temperature higher than column temperature prior to its introduction into the reversing heat exchanger. Thus, the air is cooled down to the desired low temperature to accomplish substantially complete removal of impurities, and the nitrogen effluent enters the reversing heat exchanger at a working temperature high enough to accomplish substantially complete removal of the impurities from the passage in the heat exchanger in which they were condensed from the ingoing raw compressed air.

It is accordingly an object of this invention to provide apparatus and a method for the separation of oxygen from the remaining constituents of air, in which the apparatus operates for long periods of time without shutdowns caused by plugging of the reversing heat exchanger, these long periods of trouble-free operation being made possible by a more complete removal of impurities from the air and a more complete removal of those impurities from the reversing heat exchanger passages in which they are deposited. This and other objects are accomplished by cooling the air to a desired low temperature by heat exchange with the nitrogen effluent and also with an additional cold fluid from the system, the cold fluid being in the preferred form of the invention oxygen product which is largely vapor but containing a significant quantity of liquid. The liquid content of the oxygen is important because of the greater amount of refrigeration present in a given weight of liquid than in the same weight of vapor, this greater refrigeration being due to the latent heat of vaporization of liquid, as will be well understood by those skilled in the art.

In the drawings:

Fig. 1 is a schematic drawing showing an oxygen generating system made according to the invention.

Fig. 2 shows a segment of the system illustrated in Fig. 1, but illustrating a modification.

Fig. 3 is another schematic diagram similar to Fig. 1, but showing a double column instead of a single column.

Fig. 4 is a schematic diagram of an oxygen generating system similar to that shown in Fig. 1, but modified.

Fig. 5 shows still another embodiment of the invention.

Fig. 6 shows an embodiment of the invention in which the system is designed to produce liquid oxygen; and Fig. 7 is another embodiment of the invention showing a system designed to produce liquid oxygen, but showing different means for supplying the necessary additional refrigeration for the reversing heat exchanger.

*The embodiment shown in Figs. 1 and 2*

Referring now to the drawings in detail, and more specifically to Fig. 1 of the drawings, I have shown a compressor 2 schematically, compressor 2 having an air intake 4 and an air discharge 6. Compressor 2 may be any suitable commercial air compressor, suitably driven at a constant speed.

Conduit 6 is connected to a reversing valve 8, which is connected with a number of other conduits, one of which is shown at 10. Conduit 10 is connected to a passage 12 in one part or unit 14 of a reversing heat exchanger 15. The other end of passage 12 is connected to a conduit 16 which in turn is connected with one end of a passage 18 in a second part or unit 20 of reversing heat exchanger 15. At its other end, the passage 18 in the unit 20 is connected by a conduit 22 with a reversing valve 24. As will be understood by those skilled in the art, the heat exchanger units 14 and 20 may be considered as two separate parts of a single reversing heat exchanger 15, being made in two parts in order to reduce the overall height of the generating system.

Reversing valve 24 has another conduit 26 connected with it and connecting also with one end of another passage 28 in unit 20 of the reversing heat exchanger. The other end of passage 28 connects with one end of a passage 30 in the unit 14 by way of a conduit 32. The other end of passage 30 connects with reversing valve 8 by a conduit 34. A conduit 36 is connected with reversing valve 8 and provides a discharge to atmosphere for the nitrogen effluent of the oxygen generating system.

As will be well understood by those skilled in the art, the reversing valves 8 and 24 are reversed periodically in any suitable manner, in order that the ingoing raw compressed air and outgoing nitrogen effluent may alternate between the passages 12 and 30 in unit 14 and passages 18 and 28 in unit 20. As the air flows inward toward the column through one of the passages in each unit, the nitrogen effluent flows outward toward the atmosphere through the other of the passages in each unit.

The ingoing raw compressed air is in heat exchange with another cold fluid as will be described below, and is also in heat exchange with the outflowing nitrogen effluent. The heat exchange referred to serves to cool the air far below the freezing point of water, which is one of the major impurities to be removed, and sufficiently below the solidification point of carbon dioxide, another major impurity, to separate the carbon dioxide from the air by solidification of the carbon dioxide on the walls of the passage or passages through which the air passes. Enough of the carbon dioxide must be thus separated to prevent plugging of the system beyond the reversing heat exchangers. Just exactly what that percentage is can probably be determined only with a great deal of difficulty. It suffices to point out here that there is substantially complete solidification of the carbon dioxide in the heat exchanger, principally in the unit 20, and that this is accomplished by cooling the air to a low temperature which will preferably range from 115° K. to 118° K., at 160 p. s. i. g.

A compressed air conduit 38 connects with the reversing valve 24 and is provided with a filter 40, the filter 40 being any of a number of satisfactory conventional commercial types, preferably one with a readily removable and replaceable filter cartridge. Conduit 38 has two branches, conduits 42 and 44. Branch conduit 42 connects with one end of a passage 46 in a heat exchanger 48, which for the sake of convenience may here be called a reheater. The other end of passage 46 connects with an expansion engine 50 by way of a conduit 52. The expansion engine exhaust is connected to a conduit 54, which in turn connects with one end of a passage 56 in a heat exchanger 58. The other end of passage 56 is connected to a conduit 60, in which there is provided a check valve 62 for a purpose to be described below.

The remaining branch conduit 44 is connected with one end of a passage 64 in the heat exchanger 58, the other end of which is connected to a conduit 66, in which there is provided an expansion valve 68. Conduits 60 and 66 join at 70, and form a single conduit 72 which is connected with one end of coil 74 of a boiler-condenser 76 provided in the lower end of a single column 78. The other end of coil 74 is connected with a conduit 80, which in turn connects with one end of a passage 82, also in heat exchanger 58. The other end of passage 82 is connected with a conduit 84, in which there is provided an expansion valve 86. Conduit 84, after the expansion valve 86, empties into the top of the single column at 88.

The effluent waste gases, hereinafter generally referred to as nitrogen effluent because the principle constituent is nitrogen, leave the top of the column by way of a passage to which there is connected a conduit 90. Conduit 90 is provided with a shut-off valve 92 and connects with a passage in the heat exchanger 58. It will of course be understood by those skilled in the art that the heat exchanger 58 may be any one of a number of suitable conventional heat exchangers. As shown schematically in Fig. 1, heat exchanger 58 is of the shell-and-tube type, in which the passages 56, 64 and 82 are tubes providing for the passage of expanded air, unexpanded air and liquid air respectively. The shell of the heat exchanger 58 surrounds the several passages and is of course closed at its ends and provides the passage through which the nitrogen effluent passes in its heat exchange with the coils 82, 56 and 64 in that order. Thus conduit 90 is connected with the upper end of the shell.

To provide for the passage of nitrogen effluent from the heat exchanger 58, a conduit 94 is connected to the lower end of the shell and also with the reversing valve 24. Conduit 94 is provided with a variable restriction 96, which may be any of a number of suitable conventional variable restriction valves, as will be understood by those skilled in the art, and may be varied from a completely open position to a completely closed position. At one side of the variable restriction 96, a conduit 98 having a shut-off valve 100 connects with the conduit 94 and with one end of a passage 102 in the reheater 48. The other end of passage 102 is connected with a conduit 104 which connects with the conduit 94 at a point on the other side of variable restriction 96 from the point of connection of conduit 98.

Under some circumstances, it may be desirable to bypass the heat exchanger 58 with the nitrogen effluent. To make that possible, a by-pass conduit 106 connects with the conduit 90 ahead of the shut-off valve 92, and connects with the conduit 94 between the heat exchanger 58 and the point at which conduit 98 connects with conduit 94. Conduit 106 is provided with a variable restriction 108 similar to the variable restriction 96. A conduit 110 connects the conduit 54 with the conduit 106, and is provided with a shut-off valve 112.

The oxygen product of the rectification leaves the column by way of an outlet to which is connected a conduit 114. It will be noted that the conduit 114 taps into the column by way of a short horizonal portion 116. The horizontal portion 116 taps into the column at a point immediately above the normal liquid level in the bottom of the column. The liquid level will normally be such as to completely cover the coil 74, as will be understood by those skilled in the art.

Conduit 114 connects at its other end with one end of a passage 118 in the unit 20 of the reversing heat exchanger. The other end of passage 118 is connected with a conduit 120. Conduit 120 connects with one end of a passage 122 in the reheater 48, the other end of passage 122 being connected with a conduit 124. A by-pass 126 connects the conduits 120 and 124 in such a manner as to by-pass the reheater 48. By-pass 126 is provided with a variable restriction 127 of any suitable conventional type providing variation of the passage therethrough from a completely open condition to a completely closed condition.

Conduit 124 communicates with one end of a passage 128 in the unit 14 of the reversing heat exchanger. The other end of passage 128 is connected with an oxygen discharge line 129, in which there is preferably provided a shut-off valve 130.

The unit 20 of the reversing heat exchanger is preferably provided with a heat dam or barrier 133 between the passage 118 and the passages 18 and 28 of unit 20. The heat barrier 133 is provided because of the extreme cold of the fluid passing through the passage 118. In the absence of such a heat barrier, a nitrogen effluent passage in close heat exchange relation with the passage 118 would be so cold that the nitrogen effluent would have difficulty removing the solidified carbon dioxide. Heat barrier 133 is shown schematically in Fig. 1, and is shown as being included in the colder two-thirds of the unit 20. In actual practice, the heat barrier shown schematically at 133 may be provided, where the passages 18, 28 and 118 consist of bundles of tubes soldered together, in not soldering the tube or tubes 118 to the other tubes for the colder two-thirds of the lengths of the tubes. In addition, the tube 118 is preferably separated slightly from the remaining tubes for the unsoldered two-thirds of the length in order to provide a gas space through which the heat must be conducted.

Passing now to a consideration of Fig. 2, it will be found that Fig. 2 shows a small portion of the system shown in Fig. 1 and is the same as Fig. 1 in the portions not shown. In Fig. 2, the column 78' corresponds exactly to the column 78 of Fig. 1, and the conduit 80' corresponds exactly to the conduit 80 of Fig. 1, the conduit 80' being connected with the discharge end of the coil (not shown) in the bottom of the single column. The inlet end of the coil connects with a conduit 72' which is the full equivalent of the conduit 72 of Fig. 1.

The feature that distinguishes Fig. 2 from Fig. 1 lies in the means by which a desired quantity of liquid oxygen is introduced into the product oxygen line. Whereas in Fig. 1 the system is so designed as to provide an excess of refrigeration which will permit a significant quantity of the product oxygen to leave the column in the liquid form, such that the product oxygen leaves the column as a very wet, saturated mixture, in Fig. 2 positive means are provided for taking the product oxygen from the column in a vapor state and in a liquid state and mixing the two states, in order to provide a more closely controlled condition of the product oxygen. Thus, the liquid level is shown at 134 in Fig. 2 in substantially the same location as the liquid level would be found for normal operations in Fig. 1. In Fig. 2, the product is taken in the vapor state from a point above the liquid level through a short horizontal connection 136, to which there is connected a vertical portion 138, the vertical portion 138 serving as a standpipe to assure that only vapor will leave the vertical portion 138 by way of the vapor product line 140. In addition to the vapor product oxygen line 140, a liquid oxygen product liner or conduit 142 is provided, tapping into the column at a point below the liquid level, as shown in Fig. 2. The liquid oxygen product line 142 is provided with a shut-off valve 144, valve 144 being operated in response to the liquid level in the boiler condenser 76'. Thus, I have shown schematically a float control 146 connected with an operating handle 148 for the valve 144 by way of a connecting link 150. The float control 146 and its associated linkage will be so adjusted as to completely shut off the valve 144 when the liquid in the column falls below a predetermined level.

The embodiment shown in Fig. 3

Reference will now be had to Fig. 3, which is a schematic diagram of an oxygen generating system similar to that shown in Fig. 1 but showing a double column rectifier instead of a single column. Inasmuch as all of the system shown in Fig. 3 to the left of the air expansion engine is the same as the system shown in Fig. 1, that portion of the diagram will not be described in detail; accordingly, this description will be limited to the portion of the diagram shown to the right of the expansion engine.

The expansion engine 50' of Fig. 3 is substantially the same as the expansion engine 50 of Fig. 1. The exhaust outlet of expansion engine 50' is connected to a conduit 54', which connects with a passage 56' in a heat exchanger 152. Coil 56' connects with a conduit 60' which is provided with a check valve 62'.

The other branch conduit 44' is connected to one end of a coil or passage 64' in heat exchanger 152. The other end of passage 64' is connected to a conduit 66' in which there is provided an expansion valve 68'. The conduits 60' and 66' come together at a point 70' and continue as one conduit 72" which communicates with the lower end of a double column rectifier 154. A suitable outlet for oxygen-rich liquid air from the bottom of the double column is connected to a conduit 156 which in turn is connected to one end of a passage 158 in the heat exchanger 152. The other end of passage 158 is connected to a conduit 160 in which there is provided an expansion valve 162, conduit 160 is connected to the column at a point 164 at which the composition of liquid trickling downward in the column is substantially equal to the composition of the oxygen-rich liquid in the conduit 160 being discharged into the column.

The column 154 is provided with the usual boiler-condenser 166 substantially midway between its upper and lower ends. The boiler-condenser 166 is provided with the usual nitrogen collecting shelf, not shown in detail. The shelf for nitrogen-rich liquid is connected to a conduit 168, which connects with one end of a passage 170 in heat exchanger 152. The other end of the passage 170 in heat exchanger 152 is connected to the top of the column by means of a conduit 172 having an expansion valve 174 therein.

An outlet for nitrogen effluent is provided in the upper portion of the column, to which is connected a conduit 90'; conduit 90' is connected to the upper end of heat exchanger 152, and a conduit 94' is connected to the lower end. A shut-off valve 92' is provided, as in the arrangement shown in Fig. 1. Also, the embodiment shown in Fig. 3 is provided with a nitrogen by-pass conduit 106' having a variable restriction 108', as in the apparatus shown in Fig. 1. Moreover, conduit 106' and conduit 54' are connected by a conduit 110' similar to the conduit 110 of Fig. 1 and conduit 110' is provided with a shut-off valve 112'.

The upper end of the boiler-condenser 166 is preferably provided with a small-diameter conduit 176, conduit 176 being small enough to provide a restriction to flow of fluid therethrough, and providing a bleed for rare gases from the upper end of the boiler-condenser 166. If it were not for such a bleed as the conduit 176, rare gases would accumulate in the upper end of the boiler-condenser as will be understood by those skilled in the art, and this accumulation of rare gases would interfere with the proper operation of the column.

Oxygen product leaves the double column by way of a product conduit 114' similar to the conduit 114 of Fig. 1. Conduit 114' taps into the column by way of a short horizontal length 116, which enters the column at a point immediately above the level of liquid oxygen for normal operation.

The embodiment shown in Fig. 4

Referring now to Fig. 4 for a detailed discussion of the embodiment there shown, it will be seen again that the portion of the diagram to the left of the expansion engine is the same as corresponding portions of the diagrams shown in Figs. 1 and 3 except that Fig. 4 shows no passage for nitrogen effluent through the reheater 48 of the system. Accordingly, no variable restriction is required in the nitrogen effluent conduit such as is shown at 96 of Fig. 1. Otherwise the diagram shown in Fig. 4 is, as to that portion which is to the left of the expansion engine, the same as the diagrams of Figs. 1 and 3. Accordingly, no detailed description of the portion of Fig. 4 to the left of the expansion engine will be undertaken.

Fig. 4 shows a single column 78" which is the full equivalent of the column 78 shown in Fig. 1. The nitrogen effluent outlet of column 78" of Fig. 4 is connected to a conduit 90'; it should be noted that the conduit 90' does not have the shut-off valve which is shown at 92 of Fig. 1, for the reason that no provision is made in Fig. 4 to by-pass the heat exchanger shown at 178 which corresponds generally to heat exchanger 58 of Fig. 1. The nitrogen effluent passage of heat exchanger 178 is connected to a conduit 94' which corresponds to conduit 94 of Fig. 1.

The expansion engine shown at 50" of Fig. 4 may be exactly the same engine as shown in Figs. 1 and 3. The difference between Fig. 4 on the one hand and Figs. 1 and 3 on the other hand, with regard to the expansion engine, is that, in Fig. 4, the exhaust port of expansion engine 50" is connected to the nitrogen effluent line 90' by way of a conduit 180. Thus the expansion engine exhaust conduit and the nitrogen effluent line join at the point 182, and both connect with the shell of the shell-and-tube exchanger 178.

As in the embodiment shown in Figs. 1 and 3, the compressed air conduit is divided, one branch thereof being connected to the expansion engine and the remaining branch conduit 44" being connected to one end of a passage in heat exchanger 178, this passage being shown schematically as a coil 184. The other end of passage 184 is connected to a conduit 186, which in turn connects to a coil 188 in the boiler-condenser 76" in the bottom of the single column 78". Conduit 186 is provided with an expansion valve 168'. The upper end of coil 188 is connected to a conduit 190 which is connected to one end of a passage 192 in the heat exchanger 178. The other end of passage 192 is connected to a conduit 194, in which there is provided an expansion valve 196. Conduit 194 connects with the top of the column at 198.

The oxygen product line for the embodiment of Fig. 4 is the same as that of the embodiment shown in Fig. 1 and accordingly will not be detailed in connection with Fig. 4.

*The embodiment shown in Fig. 5*

We pass now to a consideration in detail of the embodiment shown in Fig. 5. In this embodiment, a conventional air compressor 202 is provided with an intake conduit 204, and has a discharge port to which is connected a conduit 206. Conduit 206 is in turn connected to a reversing valve 208. A conduit 210 leads from reversing valve 208 to one end of a passage 212 in one part or unit 214 of the reversing heat exchanger 215. The other end of passage 212 connects by way of a conduit 216, and also other fluid passages which will be detailed below, with one end of a passage 218 in unit 220 of the reversing heat exchanger. The other end of passage 218 is connected by way of a conduit 222 with one port of a reversing valve 224. A conduit 226 connects another port of the reversing valve 224 with one end of a passage 228 in the unit 220 of the reversing heat exchanger. The other end of passage 228 is connected with one end of a passage 230 in the unit 214 by way of a conduit 232. The other end of passage 230 connects with reversing valve 208 by means of conduit 234.

A conduit 238 leads from reversing valve 224 and is provided with a filter 240 similar to the filter at 40 of Fig. 1. Conduit 238 branches out into branch conduits 242 and 244. The conduit 242 connects with one end of a passage 246 in a heat exchanger which for purposes of convenience in this description will be referred to as a reheater 248. The other end of passage 246 is connected to expansion engine 250 by way of a conduit 252.

The expansion engine exhaust port is connected to a conduit 254, which in turn is connected to a passage shown as a coil 256 in the heat exchanger 258. The other end of passage 256 is connected to a conduit 260 having therein a check valve 262.

Branch conduit 244 connects with one end of a fluid passage shown as a coil 264 in the heat exchanger 258, the other end of passage 264 being connected to a conduit 266 having therein an expansion valve 268. The two conduits 266 and 260 join at 270, and continue as one conduit 272 to the bottom of a double column which is similar to the double column shown in Fig. 3 and accordingly need not be detailed here.

As in the embodiments of the invention shown in Figs. 1 and 3, the nitrogen effluent outlet is connected to a conduit 290, which connects with the shell of the shell-and-tube type heat exchanger 258. A conduit 294 connects the lower end of the shell and the reversing valve 224. Thus far, it will be noted that the embodiment shown in Fig. 5 differs from the embodiment shown in Figs. 1 and 3, in that the embodiment shown in Fig. 5 shows no by-pass whereby the nitrogen effluent may by-pass the heat exchanger 258 and also shows no fluid passage for the nitrogen effluent through the reheater 248. Other differences will appear below.

The oxygen outlet from the double column 296 is connected to a conduit 314, which is connected with the column by a short horizontal portion 316. As in the case of the other embodiments, conduit 316 taps into the column at a point immediately above the normal liquid level for oxygen collecting in the boiler-condenser of the double column 296.

Conduit 314 connects with one end of a fluid passage 318 in the unit 220 of the reversing heat exchanger, the other end of passage 318 being connected with a conduit 320 which connects directly with a passage in the unit 214 of the reversing heat exchanger as will be described below. Thus it will be seen that the oxygen circuit of the embodiment shown in Fig. 5 differs from that of the embodiments shown in Figs. 1 and 3, inasmuch as the embodiments shown in Figs. 1 and 3 use the oxygen product between the two parts of the reversing heat exchanger to accomplish at least a part of the reheating of the air going to the expansion engine. In the embodiment shown in Fig. 5, the reheating of the air going to the expansion engine is shown as being accomplished alternately by the ingoing raw compressed air and the outgoing nitrogen effluent. Thus the conduit 216 referred to above connects with a passage 322 in the reheater 248, the other end of passage 322 being connected with the above-referred-to passage 218 by a conduit 324. As in the embodiments of Figs. 1 and 3, the passage 322 in reheater 248 may be by-passed by a by-pass conduit 326 connected with the conduits 216 and 324 and having therein a variable restriction 328.

Returning now to the oxygen product line, it will be recalled that the conduit 320 connects with one end of passage 318 in unit 220, and continuing from there, connects also with one end of a passage 330 in unit 214 of the reversing heat exchanger. The other end of passage 330 connects with a conduit 332 in which there is provided a shut-off valve 334.

The embodiments of the invention shown in Figs. 1–5 and just described all relate to oxygen generators which deliver the oxygen in the vapor form. I now take up a discussion of two embodiments of my invention which are designed to produce and deliver oxygen in the liquid form.

*The embodiment shown in Fig. 6*

Referring first to the embodiment shown in Fig. 6, a conventional compressor 402 is shown having an air intake 404 and connected to discharge compressed air through a conduit 406 to a reversing valve 408. A conduit 410 connects with one end of a passage 412 in a unit 414 of a reversing heat exchanger 415 which is similar to the reversing heat exchangers shown in Figs. 1–5 except that the unit 414 is provided with only two fluid passages therethrough instead of three as in the other embodiments.

The other end of the passage 412 connects with a conduit 416 which in turn is connected with one end of a fluid passage 418 in unit 420 of the reversing heat exchanger. The other end of passage 418 connects with a conduit 422 which in turn connects with a reversing valve 424. Reversing valve 424 connects with another conduit 426 which connects with one end of a fluid passage 428 in the unit 420 of the reversing heat exchanger. The other end of fluid passage 428 connects with a fluid passage 430 in the unit 414 by way of a conduit 431, a fluid passage 432 in a heat exchanger or reheater 433, and a conduit 434. Again, the fluid passage 432 may be by-passed by a branch conduit 435 having therein a variable restriction 436, the branch conduit 435 connecting the conduits 431 and 434.

The other end of fluid passage 430 in unit 414 connects with a conduit 437 which connects with the reversing valve 408, and another fluid conduit 438, connected with reversing valve 408, provides the discharge to atmosphere of the nitrogen effluent.

A conduit 439 connects the reversing valve 424 with a filter 440 similar to the filter 40 of the embodiment of Fig. 1. The conduit 439 is divided into two branches 442 and 444, the conduit 442 connecting with one end of a fluid passage 446 in the reheater 433. The other end of passage 446 connects with an expansion engine 450 by way of a conduit 452. The exhaust port of expansion engine 450 is connected by means of a fluid conduit 454 directly with the single column 478.

The remaining branch 444 is connected to one end of a passage shown as a coil 464 in a heat exchanger 465, the other end of passage 464 being connected to a conduit 466 which has in it an expansion valve 468. Conduit 466 connects with a coil 474 in the boiler-condenser 476 of the single column 478. The other end of coil 474 is connected to a conduit 480 which in turn connects with one end of a fluid passage shown as a coil 482 in the heat exchanger 465, the other end of coil 482 being connected to a conduit 484 in which there is provided an expansion valve 486. The conduit 484 is connected to the top of the column at 488.

The nitrogen effluent outlet from the column is connected to a conduit 490, which connects with the upper end of the shell of the shell-and-tube heat exchanger 465. At its other end the shell of the heat exchanger 465 is connected with a conduit 494, which connects with the reversing valve 424.

Product oxygen is taken from the boiler-condenser of the single column shown at 478, by way of a conduit 496 and a shut-off valve 498. A conduit 500 taps into the conduit 496 upstream of the valve 498 and connects with a liquid pump 502, and the pump discharge is connected to a conduit 504. Conduit 504 is connected with one end of a fluid passage 506 in the unit 420 of the reversing heat exchanger, the other end of fluid passage 506 being connected with a conduit 508. Conduit 508 is connected into the boiler-condenser of the column as shown at 510.

A valve 512 is provided in the conduit 508 and is connected to be controlled by the temperature in the air going to the expansion engine, namely the temperature of the air in the branch conduit 442 prior to its reheating in the reheater 433. The means for such control of valve 512 include a bulb or other temperature-sensitive element 514 mounted in heat exchange relation to the conduit 442. The bulb 514 is connected with the operating mechanism of valve 512 by a conduit 516.

The embodiment shown in Fig. 7

Referring now in detail to the embodiment shown in Fig. 7, it will be seen that this embodiment differs from that of Fig. 6 only in that, in the embodiment of Fig. 7, the fluid used to provide the necessary additional refrigeration in the reversing heat exchanger is liquid air rather than liquid oxygen. To that end a separator 518 is provided in the air conduit 466'.

The separator 518 is provided with a liquid outlet, to which a conduit 520 is connected. Conduit 520 is connected with one end of a fluid passage 522 in the unit 420' of the reversing heat exchanger. The other end of fluid passage 522 is connected with a conduit 524, and the conduit 524 is connected with the conduit 454' which carries the exhaust of expansion engine 450' to the column 478.

As was described in connection with Fig. 6, wherein a valve is provided in the oxygen conduit 508, that valve being controlled by the temperature in the branch of air going to the expansion engine, a similar valve 512' in Fig. 7 is provided in the conduit 524, valve 512' being controlled by a temperature-sensitive element 514' by means of a connecting conduit 516', the valve 514' being subjected to the temperature of the air in conduit 442'.

It will be understood by those skilled in the art that the combination aspect of the invention disclosed in Figs. 1–5 may be practiced with any column having means to discharge a saturated vapor oxygen product in which a significant quantity (25% to 35%, usually) of liquid is carried over with the vapor. In a column having a well-defined liquid oxygen operating level, either the expedient of an oxygen outlet tap just above the liquid level (as in Figs. 1 and 3–4) may be used, or, alternatively, some device such as that shown in Fig. 2 may be used.

Where the column is of a type which does not provide a definite liquid oxygen operating level, but in which there is instead a zone of mixed liquid and vapor of varying composition, the oxygen outlet tap is provided in the zone where it will give the desired degree of wetness—usually between 25% and 35% by weight of liquid.

The method described

The method aspect of the invention will now be set forth in detail. The compressor delivers air at substantially atmospheric temperature and at 160 p. s. i. g. to the reversing heat exchanger by way of a reversing valve. In the two parts of the reversing heat exchanger, the temperature of the air is brought down to a sufficiently low value to condense all of the water and substantially all of the carbon dioxide, this condensation taking the form of solidification of those and other impurities and the adherence of those impurities in the solid form to the walls of the passage or passages in the reversing heat exchanger. Cooling is accomplished by heat exchange with at least one product of the rectification, said at least one product being the nitrogen effluent. In the preferred form of the invention as practiced, the cooling of the raw compressed air is accomplished also by heat exchange with an additional cold fluid from the system, that cold fluid containing at least a significant quantity of liquid, and in some instances being substantially all liquid. I have found that the additional cold fluid is necessary to accomplish the cooling of the air to a temperature low enough to separate the carbon dioxide out of the air to a sufficient extent to permit operation for extended periods of time of the system without shutdowns occasioned by plugging of the apparatus by carbon dioxide snow.

Just how cold the air should be when it leaves the reversing heat exchanger by way of the second reversing valve is of course not something that can be set down as a precise value. It appears however that for economic and successful operation and practice of the method aspect of the invention, the air should leave the reversing heat exchanger at a temperature in the range of 115° K.–118° K.

The method aspect of the invention may be practiced in several ways, and a number of these means of practicing the method aspects of the invention will be detailed here. Let us first take up the method in which the compressed air is divided into two branches. This description will deal with the practice of the invention in a single column rectifier and those skilled in the art will be able to visualize the practice of the invention in a double column rectifier.

In this method of practicing the invention, one branch of the compressed air goes to an expansion engine by way of a reheater. In the reheater, the temperature of the air is raised to approximately 123° K., after which the air goes to the expansion engine, expanding therein to a pressure of approximately 70 p. s. i. g. The expansion with the performance of external work effects a temperature reduction in the expanded air to approximately 106° K. The expanded air is then further cooled by heat exchange with the nitrogen effluent and joins that branch of the air which by-passed the expansion engine and which has also been further cooled by heat exchange with the nitrogen effluent. This remaining branch of the air which did not pass through the expansion engine is nevertheless expanded, substantially isenthalpically to approximately 70 p. s. i. g. in an expansion valve, this expansion taking place after the further cooling by heat exchange with the nitrogen effluent. The air which is thus expanded in the expansion valve joins the air which is expanded in the expansion engine, the air from the expansion engine preferably passing through a check valve before it is mingled with the air from the expansion valve. The mixture of the two branches of air then passes at approximately 102° K. into the coil of the boiler-condenser.

Air leaves the boiler-condenser coil from the bottom of the single column at a temperature of approximately 97° K., and in an almost completely liquid state. This mostly liquid air is subjected to heat exchange with the nitrogen effluent whereby it is cooled to approximately 92½° K., after which it is expanded in an expansion valve to approximately 7 p. s. i. g. and passes into the column at the top. The air is rectified in the rectification column in a manner well known to those skilled in the art and the rectification therefore need not be detailed herein.

Nitrogen effluent leaves the nitrogen effluent outlet at the top of the column at approximately 7 p. s. i. g. and at approximately 85° K. After leaving the column, the nitrogen effluent is preliminarily heated; preferably, the heating is effected by heat exchange with the liquid air from the boiler-condenser in the column, the expanded air from the expansion engine, and the unexpanded or compressed air from the aforesaid remaining branch of the air supply, in that order. This preliminary heating of the nitrogen effluent is necessary in order that the nitrogen effluent may enter the reversing heat exchanger at a warm enough temperature to accomplish sublimation, at the existing pressure, of the carbon dioxide solid and melting of the ice in the passages of the reversing heat exchanger. Complete removal of these impurities is necessary if the heat exchanger (and therefore the entire system) is to continue in operation for periods of time long enough to make operation of the generator economically practical. It may be noted that other means of preliminarily heating the nitrogen effluent may be used. For example, I have shown in Figs. 1 and 3 a passage for the nitrogen effluent through a reheater, in which it is possible to preliminarily heat the nitrogen effluent by heat exchange with that branch of the compressed air which passes to the expansion engine.

It is not possible or feasible to state arbitrarily that a given temperature of the nitrogen effluent is the dividing line, and that a generator will not work if the temperature of the nitrogen effluent is below such arbitrary temperature but will work if the temperature is higher than such arbitrary temperature. If a generator is to be operated for short periods of time each day and is to be shut down over long periods of time each day the generator might operate successfully for weeks without any interruption due to shutdown caused by plugging. On the other hand, where a generator must operate continuously day after day, week after week, it is probable that the temperature of the nitrogen effluent going into the reversing heat exchanger must consistently be fairly high, meaning by that warm enough to begin sublimation of the solid carbon dioxide as soon as it enters the reversing heat exchanger. Another factor which affects the operation is of course the carbon dioxide content of the air supply.

Theoretically, the nitrogen effluent should enter the reversing heat exchanger at a temperature in the range of 110° K. to 115° K. at the pressure obtaining in the reversing heat exchanger, that pressure being something less than 7 p. s. i. g. owing to the pressure drop from the column to the point of entry into the reversing heat exchanger. Notwithstanding the theoretical value to which the temperature of the nitrogen effluent should be raised, I have successfully operated a generator in which the nitrogen effluent entered the reversing heat exchanger at 107° K.

In the reversing heat exchanger, the nitrogen effluent is in heat exchange with the incoming raw compressed air, and is warmed by the air while the air is cooled. The outgoing nitrogen effluent sublimes the solid carbon dioxide and sublimes the ice in the passage or passages of the reversing heat exchanger through which it happens to be passing, carrying those impurities out in the stream of effluent gas to the atmosphere.

The oxygen product is taken from the column at a point just above the normal operating liquid level of the column. The system is so designed as to provide an excess capacity of refrigeration. This excess refrigerative capacity will cause a substantial or significant quantity of liquid oxygen to leave the column by way of the product oxygen line. Some of the liquid will leave the column and pass out through the product line in the form of entrained droplets carried along in the vapor and at times the liquid will pass through the product line in the form of slugs of liquid rather than in the form of entrained droplets. The product oxygen passes through the reversing heat exchanger, and in so doing is warmed and evaporated as it cools the air. The significant quantity of liquid is necessary in order to cool the air to a low enough temperature to condense out substantially all of the carbon dioxide. It will of course be understood by those skilled in the art that there is more refrigerative capacity in liquid than in vapor because of the latent heat of vaporization of the liquid. This is the significance of the liquid in the product oxygen line. It may be noted that the level of liquid oxygen in the column remains substantially constant.

The oxygen product leaves the column at a temperature of approximately 95° K., entering the reversing heat exchanger at that temperature. In order to make it possible for the nitrogen effluent to remove effectively the solid carbon dioxide, in the preferred form of the invention, the method is practiced by an inefficient heat transfer between the product oxygen and the incoming compressed air at the cold end of the reversing heat exchanger. This inefficient method of heat transfer is illustrated in the drawings by the symbol of a heat barrier between the product oxygen and the other fluids in the cold two-thirds end of the cold part of the two-part reversing heat exchanger. Product oxygen leaves the product line at substantially atmospheric temperature and approximately atmospheric pressure, ready for compressing to any suitable working pressure.

Reference is made above to the reheater in which the air passing through the expansion engine is raised in temperature from approximately 115° K. to approximately 123° K. This reheating of the air passing through the expansion engine must of course be accomplished by a fluid which is hotter than the air entering the reheater. Several fluids in the rectification system are hot enough to accomplish the reheating, and I may practice the invention by utilizing one of these fluids. Preferably, the fluid used is taken as it leaves one part of the two-part reversing heat exchanger and before it enters the other part of the two-part reversing heat exchanger. Thus, I may use ingoing raw compressed air and the outgoing nitrogen effluent alternately. The alternative use of these two fluids as the heating medium in the reheater comes about because the heat exchange passage or passages of the reheater is present in only one set of the passages which alternately carry air and nitrogen effluent. The nitrogen effluent entering the reheater enters at a temperature of approximately 164° K., while the compressed air, when it is in the passage going through the reheater, enters at approximately 175° K. Thus the two fluids used to reheat the air going through the expansion engine are not at the same temperature. However, they are both so much hotter than the air passing to the expansion engine that both are effective, almost equally so, in reheating the air passing to the expansion engine.

Another means of reheating the air going to the expansion engine is to utilize the product oxygen for this purpose, taking the oxygen as it leaves one part of the two-part reversing heat exchanger, passing it through the reheater, and then passing it through the other part of the two-part reversing heat exchanger.

As was pointed out above, the foregoing description of the practice of the method aspect of the invention dealt with the division of the compressed air into two branches, one of which passed through the expansion engine after reheating and the other of which passed to a heat exchanger after which it is joined with the expanded air and passes to the column for rectification. My invention may be practiced by passing all of the air to the expansion engine after reheating the air to raise its temperature somewhat prior to the expansion with the performance of external work. In this manner of practicing the method aspect of the invention, the nitrogen effluent is of course preliminary heated in a heat exchanger by thermal contact with two fluids rather than three, these two fluids being, in a single column system, the liquid air from the boiler-condenser, and the expanded air, whereas in the method aspect wherein the compressed air is divided into two branches, still another branch, namely the unexpended branch, also serves to preliminarily heat the nitrogen effluent.

Still another method aspect of the invention as it may be practiced involves the division of the compressed air into two branches, one of which is reheated prior to its expansion with the performance of external work, but in this method aspect of practicing the invention, the expanded air does not pass to the column for rectification, but is mingled with the nitrogen effluent and passes outward therewith, adding its refrigeration to the refrigeration of the nitrogen effluent. In this manner of practicing the invention, the expanded air after its performance of external work mingles with the nitrogen effluent just after the nitrogen effluent leaves the column and prior to the preliminary heating of the nitrogen effluent.

In practicing this method aspect of the invention, the mixture of expanded air and nitrogen effluent is, in a single column system, in heat exchange with the liquid air from the boiler-condenser, and the compressed air which ultimately enters the column for rectification.

When practicing the method aspect of this invention in a double column rectification system, wherein the air is divided into two branches, one of which is expanded with the performance of external work—i. e., isentropically—and the other of which is further cooled, is expanded isenthalpically, and is then joined with the isentropically expanded air, the nitrogen effluent is conveniently preliminarily heated by heat exchange with four fluids rather than three as in the case of the single column. The four fluids are, in the order named, the nitrogen-rich liquid from the nitrogen shelf of the boiler-condenser, the oxygen-rich liquid from the very bottom of the double column, the isentropically expanded air, and the compressed air prior to its isenthalpic expansion.

In practicing the method aspect of the invention to produce liquid oxygen, the air fraction which is expanded isentropically goes directly from such expansion to the column. In that case, the air expands through a broader range, namely, from approximately 158 p. s. i. g. (allowing for 2 p. s. i. pressure drop through the various fluid passages from the compressed air to the expansion engine intake) down to the column pressure, approximately 7 p. s. i. g.

In practicing the method aspect of my invention, it will be noted that it is necessary to design the system with an excess of refrigerative capacity. By this is meant that the system is designed and built to provide more refrigeration than is theoretically necessary under extreme heat and humidity operating conditions. It may further be noted that the speed of the expansion engine can be varied to vary the amount of refrigeration supplied by the expansion engine. When the speed of the expansion engine is reduced, the ratio of the intake pressure to the exhaust pressure in the expansion engine goes up, because the speed and capacity of the compressor remain constant. The expansion engine makes a smaller number of strokes per minute, but there is more work for each stroke, and the increase in the amount of work done per stroke is not in proportion to the decrease in the number of strokes per minute.

It may be noted here that the refrigerative capacity is not critical in the practice of this invention. So long as there is an excess of refrigerative capacity, the system is self-regulating. There must be an excess of capacity, in fact if there is not an excess, the system will ultimately shut down for lack of sufficient refrigeration.

For an understanding of the self-regulating features of the system, let it be supposed that a considerable excess of refrigeration is being produced by the expansion engine under the operating conditions. This excess of refrigeration will result in an increase in the amount of liquid carried over to the reversing heat exchanger in the product oxygen line. This increase in the liquid carried over to the reversing heat exchanger results in a lower temperature of the air going to the expansion engine. It will be remembered that the compressor is operating at a fixed speed and a fixed capacity and that the expansion engine speed has been predetermined so that the expansion engine likewise is running at a fixed speed and fixed capacity. Under these circumstances, a reduction in the temperature of the air going to the expansion engine results in an increase in the density of the air going to the expansion engine and the increased density coupled with the fixed capacity of the compressor and of the expansion engine serves to reduce the input pressure of the compressed air going to the expansion engine. The reduced input pressure to the expansion engine effects a reduction in the amount of refrigeration supplied by the expansion engine, and the previous excess of refrigeration is automatically reduced.

The self-regulating feature referred to results in a variation in the load on the compressor with varying operating conditions. Thus, when the system is designed and built for a pressure of 160 p. s. i. g. in the high pressure end of the air stream for extremely adverse operating conditions—i. e., high temperature and high humidity of the ambient air—it will be found that in winter weather the compressor operates at a discharge pressure of something like 142 p. s. i. g.

*Operation*

Reference will be had again to the embodiment of the invention shown in Fig. 1 for a discussion in detail of the operation of the oxygen generating system there shown. First, let us consider the operation of the system from a warm condition until the system is cooled down sufficiently to begin producing oxygen.

To operate the system to cool it down from room temperatures, valves 92 and 112 are opened wide as is also the variable restriction 96, while the variable restriction 108 is completely closed and valve 100 is preferably closed. Under these conditions, the ratio of intake air pressure to exhaust air pressure for the expansion engine is high, because the air expands all the way down from approximately 158 p. s. i. g. to about 7 p. s. i. g., so that, during the cool-down period, the expansion engine delivers a maximum of refrigeration. With the expansion engine exhaust open to 7 p. s. i. g. the check valve 62 will never be opened against the pressure existing in the conduit 72; thus the valve 62 is closed automatically during cool-down.

The compressor takes in air through the air intake 4 and discharges compressed air at approximately 160 p. s. i. g. to the conduits 6 and 10 through the reversing valve 8 (in the position of the valves shown in Fig. 1).

The compressed air passes through the passage 12 in unit 14 of the reversing heat exchanger 15, then passes through conduit 16 to passage 18 in the unit 20, thence to conduit 22, through the reversing valve 24 and to the conduit 38. After passing through the filter 40, the compressed air divides, one fraction passing to the expansion engine and expanding isentropically from approximately 158 p. s. i. g. to approximately 7 p. s. i. g., leaving the expansion engine by way of conduits 54, 110, part of 106, and part of conduit 90, through the valve 92, through the shell of the shell-and-tube type heat exchanger 58, and out to the atmosphere by way of conduit 94, reversing valve 24, conduit 26, in unit 20, conduit 32, passage 30 in unit 14, conduit 34, reversing valve 8 and to the atmosphere by way of the discharge conduit 36. The other or remaining fraction passes through branch conduit 44 to the coil 64 in heat exchanger 58 where this fraction of the compressed air is in heat exchange relation with the cold expanded air coming from the expansion engine. The compressed air leaves the coil 64 by way of conduit 66, and expands isenthalpically in the expansion valve 68. The air thus expanded passes to the coil 74 by way of conduit 72, and thence passes to coil 82 by way of conduit 80. In coil 82, the air is again in heat exchange relation with cold expanded air from the expansion engine 50. Leaving coil 82, the expanded air passes by way of conduit 84 through expansion valve 86 where its pressure is again reduced, to approximately 7 p. s. i. g., and into the column at 88.

Thus it can be seen that the refrigerative effect of the expansion engine is regenerative, in that the refrigeration tends to progressively reduce the temperature of the air passing (via units 14 and 20) to the expansion engine. This regenerative effect continues until liquid begins to form in the coil 64. This liquid is carried over into the column through the expansion valve 86 and cools down the column. When the column has cooled down sufficiently, liquid begins to accumulate in the bottom of the column. As soon as the operator has ascertained that the liquid in the column has reached a desired level, he closes valve 112, and the system begins to operate to produce oxygen.

Passing now to a description of equilibrium operation, we find that compressed air passes through the reversing valves and the reversing heat exchanger as outlined above, and nitrogen effluent passes outward through the reversing valves and the reversing heat exchanger. Periodically the valves 8 and 24 reverse to interchange the passages through which compressed air and nitrogen effluent are flowing. Thus, whereas in the position of the valves shown in Fig. 1, compressed air flows into the system by way of passages 12 and 18, and nitrogen effluent leaves through passages 28 and 30, after the valves have been reversed, air flows through passages 30 and 28 and nitrogen effluent leaves through passages 18 and 12. As the compressed air flows inward through the reversing exchanger it is cooled by thermal contact with the nitrogen effluent and with the cold fluid containing a significant quantity of liquid. In the embodiment shown in Fig. 1, the cold fluid is the product oxygen, this product being mostly vapor, but containing from twenty-five percent to thirty-five percent by weight of liquid.

As the air cools down, first the water and then the carbon dioxide are deposited on the walls of the passages through which the air flows. The impurities continue to accumulate throughout the period during which air flows through those passages. At the end of the period, the valves 8 and 24 are reversed, and nitrogen effluent flows outward through those same passages, subliming the carbon dioxide and vaporizing the ice and water accumulated in the passages during the previous period. The periods are so timed that the accumulation of impurities in the passages during a period of operation are not so great as to effect a plugging of the passages sufficient to interfere with the efficiency of operation of the system.

Air in a dry state and freed of carbon dioxide leaves the reversing exchanger by way of conduit 38 and divides into two fractions, one fraction passing to the branch conduit 42 and the remaining fraction passing to the branch conduit 44. The fraction in the branch conduit 42 is reheated in the reheater 48 by heat interchange with a warmer fluid leaving one part of the reversing heat exchanger and prior to its entry into the other part of the exchanger. With its temperature raised somewhat, the air expands isentropically in the expansion engine, and leaves at a pressure of approximately 70 p. s. i. g. in conduit 54, whence it passes to coil 56 where it is in thermal contact with the nitrogen effluent flowing outward in heat exchanger 58. The expanded air leaves the coil 56 by way of conduit 60 and check valve 62.

Turning now to the remaining fraction of the compressed air, we see that it passes to coil 64 from conduit 44; in coil 64 the air is in thermal contact with the nitrogen effluent flowing downward in the heat exchanger, and leaves the coil 64 by way of conduit 66. The air expands isenthalpically in expansion valve 68 from approximately 158 p. s. i. g. to approximately 70 p. s. i. g., and the isenthalpically expanded stream of air joins the isentropically expanded stream of air, the two streams coming together at 70 and continuing together in the conduit 72 to the coil 74 in the boiler-condenser in the lower part of the single column 78.

A very large proportion of the air is liquefied in the coil 74, and passes to coil 82 by way of conduit 80. In the coil 82, the mixture of liquid and vapor is exposed to thermal contact with the very cold nitrogen effluent which has just left the column. As a result, if there is any vapor going into coil 82, it is largely condensed. If conditions are such that all of the fluid flowing into coil 82 is liquid, then the liquid will be subcooled in coil 82 prior to its passage to the expansion valve 86, wherein the fluid expands isenthalpically from a pressure of approximately 70 p. s. i. g. to a pressure of approximately 7 p. s. i. g. at which pressure the fluid enters the top of the column at 88.

As will be well understood by those skilled in the art, the air is rectified in the single column rectifier 78, the nitrogen effluent leaving from the top of the column by way of the conduit 90, and the substantially pure oxygen accumulating in the liquid collecting pot at the bottom of the column, more specifically in the boiler-condenser 76. The very cold (approximately 85° K.) nitrogen effluent leaving by way of conduit 90 passes through the shell of the shell-and-tube type heat exchanger 58 where it is in thermal contact in succession with the liquid air, the isentropically expanded air, and the remaining, unexpanded, fraction of compressed air, after which the nitrogen passes by way of conduit 94 to the reversing exchangers and out to the atmosphere.

It should be noted that the passage of the nitrogen effluent through the heat exchanger 58 serves to heat the nitrogen preliminarily to its heating in the reversing heat exchangers. This preliminary heating of the nitrogen effluent prior to its introduction into the reversing exchangers is an important part of the invention. If under some conditions it be found that the heating of the nitrogen effluent accomplished in the heat exchanger 58 is not sufficient the nitrogen effluent can be heated still more by closing or partially closing the variable restriction 96 and opening the valve 100, whereupon the nitrogen effluent will pass through the passage 102 in the air reheater 48. Having been preliminarily heated to a temperature in the range 110° K.–115° K., the nitrogen effluent passes to the reversing heat exchanger, where it sublimes the solid carbon dioxide and vaporizes the water.

Product oxygen leaves the boiler-condenser by way of conduits 116 and 114, and passes to the reversing heat exchanger. The very cold product oxygen, containing from twenty-five to thirty-five per cent of liquid by weight, supplies the refrigeration which is needed in the reversing heat exchanger to bring the air temperature down low enough to assure that substantially all of the carbon dioxide will be removed by solidification in the reversing heat exchanger. In the embodiment of the invention shown in Fig. 1, after the oxygen leaves the unit or part 20 of the two-part heat exchanger, it passes to the reheater 48, namely through the passage 122 thereof, after which the product oxygen continues by way of conduit 124 through the unit or part 14 of the two-part heat exchanger, and goes out to the product line 129 through the valve 130.

Reference is made at this time to the statements above that the product tap 116 opens into the column at a point immediately above the normal liquid level, and that, nevertheless, liquid carries over in the product line in substantial quantity. I am not prepared at this time to say positively why the apparatus functions in this manner, but it would seem that the liquid is carried over by entrainment. Those skilled in the art of steam engineering know that, unless elaborate arrangements are made to assure that only dry steam leaves the space above the boiling water, large quantities of undesirable liquid are entrained with the steam and are carried to the turbine or superheater, resulting in the erosion of turbine blades or in the impairment of superheater efficiency.

In fact, precisely to prevent such entrainment, I have provided the vertical standpipe device 138 in Fig. 2, which is analogous to a steam separator in a steam boiler. In apparatus made according to Fig. 1, the product tap is horizontal or substantially so and, being just above the liquid level, carries over significant quantities of liquid, probably by entrainment, although I do not by any means indicate that my invention is limited to an entrainment theory of operation.

Although I have found that a liquid content of from twenty-five per cent to thirty-five per cent by weight in the product oxygen going to the reversing heat exchanger is desirable to permit continuous operation of the generating system for long periods of time without shut-downs, it will of course be understood that the invention may be practiced satisfactorily for shorter periods of continuous running time with a smaller proportion of liquid in the product oxygen.

The operation described above of the embodiment shown in Fig. 1 presumed the division of the compressed air into two branches or, perhaps more accurately, fractions. The invention may be practiced by operating the system with all of the air going through the expansion engine. To effect operation of the system in this manner, it is merely necessary to close the expansion valve 68 completely, which of course will insure that all of the air will pass through the expansion engine 50 wherein it will expand with the performance of external work.

Referring now to the embodiment shown in Fig. 2, in the operation of a generator built according to the embodiment of Fig. 2, so long as there is an excess of refrigeration above a predetermined minimum, there is an assurance of a quantity of liquid always passing out of the column and mixing with the vapor product, because the excess of refrigeration will effect a rise in the liquid level 134, permitting the float control device 146 to open the valve 144, and thus allowing liquid to leave the column by way of the conduit 142. The vapor and liquid mix and pass outward to the reversing exchanger as described above.

The operation of an oxygen generating system made according to the embodiment of the invention shown in Fig. 3 is very much like the operation of the system shown in Fig. 1. The difference between the two is that Fig. 3 shows a double column rectifier system whereas Fig. 1 shows a single column system. The differences in operation between the two systems will be well understood by those skilled in the art and need not be detailed here, where it will suffice to point out that there is one more fluid in the heat exchanger 152 in thermal contact with the nitrogen effluent. This fluid is the nitrogen-rich liquid collecting on the nitrogen shelf of the boiler-condenser 166. The nitrogen-rich liquid leaves by way of conduit 168 and passes through the coil 170 in heat exchanger 152 where it is in thermal contact with the nitrogen effluent, more specifically where it is the very first of the fluids in thermal contact with the nitrogen effluent. The nitrogen-rich liquid continues through the system by way of conduit 172 and is expanded isenthalpically in valve 174 from approximately 70 p. s. i. g. to approximately 7 p. s. i. g. and the expanded nitrogen-rich liquid enters the top of the column and is rectified therein along with the expanded (via valve 162) oxygen-rich liquid which enters the column at the point 164.

The operation of the embodiment shown in Fig. 4 need not be set forth in detail here in view of the considerably detailed description of operation already made of the foregoing embodiments. Fig. 4 differs from Fig. 1 chiefly in that the expanded air fraction expands from an inlet pressure of 158 p. s. i. g. to an exhaust pressure of approximately 7 p. s. i. g. in the expansion engine 50″, whereas in the embodiment shown in Fig. 1, the expansion in the expansion engine is from 158 p. s. i. g. to approximately 70 p. s. i. g. Another difference is that in Fig. 4, the isentropically expanded air mingles with the nitrogen effluent at 182 just prior to the passage of the nitrogen effluent through the heat exchanger 178, whereas in the embodiment shown in Fig. 1, the isentropically expanded air is mixed with the unexpanded fraction and is itself rectified in the rectification column. In the embodiment of Fig. 4, the isentropically expanded air does not of course get into the column, but its refrigeration is utilized in heat exchanger 178 and in the reversing heat exchanger.

In the embodiments of the invention shown in Figs. 1–4, the air passing to the expansion engine is reheated in a reheater which derives its heat from the product oxygen. In the embodiment shown in Fig. 5, the heat to raise the temperature of the air going through the expansion engine comes from, alternately, the ingoing compressed air, and the nitrogen effluent. Otherwise, the operation of the embodiment shown in Fig. 5 is substantially identical with the operation of the embodiment shown in Fig. 3, inasmuch as both of the embodiments in Figs. 3 and 5 are shown as double column systems.

The embodiments of the invention shown in Figs. 6 and 7 resemble the embodiment shown in Fig. 5 in that, in all of Figs. 5, 6 and 7, the heat to reheat the fraction of air which passes to the expansion engine is derived alternately from the incoming compressed air and the outgoing nitrogen effluent. However, the embodiments shown in Figs. 6 and 7 differ from all of the embodiments of Figs. 1–5 in that Figs. 6 and 7 show liquid oxygen generators. In other words, in the embodiments of Figs. 6 and 7, the oxygen product is taken from the system in the liquid form.

In Fig. 6, the extra refrigeration required to reduce the temperature of the air in the reversing heat exchanger sufficiently is derived from a portion of the liquid product which is circulated through the cold unit of the two-part reversing heat exchanger. Thus, the liquid pump 502 takes a portion of the liquid product and pumps it through passage 506 in the unit 420 of the two-part reversing exchanger, after which the warmed oxygen product passes off into the column by way of conduit 508.

The quantity of liquid which is permitted to pass through the passage 506 in the reversing heat exchanger is controlled by the valve 512 in the conduit 508. Valve 512 is controlled by an operating mechanism which is in turn controlled by the bulb 514 by way of the connection 516. Bulb 514 is secured to the conduit 442 so as to be in thermal contact with the air flowing to the expansion engine 450 in the conduit 442. The operation of the control is as follows: If the temperature in the conduit 442 rises beyond a predetermined maximum, valve 512 opens wider to allow a greater quantity of liquid to flow through the passage 506 in the reversing heat exchanger 415. It may be noted here that the pump 502 maintains a substantially constant pressure in the discharge conduit 504. The pressure and the capacity of the pump are such as to be able to supply the maximum demand of liquid oxygen for the reversing heat exchanger. When the demand is less than the maximum, a relief valve automatically opens at a predetermined pressure and returns the excess liquid to the conduit 496. The relief valve and bypass features are integral with the pump, as will be understood by those skilled in the art and the pump is a standard article of commerce, so the details of these features are not discussed here.

The operation of the embodiment shown in Fig. 7 is similar to the operation of the embodiment shown in Fig. 6 and need not be detailed here. The difference between the two systems is that in Fig. 7, liquid air, separated in the separator 518, is passed through the reversing heat exchanger instead of liquid oxygen. The operation of the embodiment shown in Fig. 7 will be well understood by those skilled in the art from the foregoing description of the operation of the embodiment shown in Fig. 6.

It will be seen by those skilled in the art that I have here provided an invention which permits cooling of the air to a satisfactorily low temperature in the reversing heat exchanger to accomplish substantially complete solidification of the carbon dioxide and accordingly substantially complete removal there. Furthermore, the removal of the carbon dioxide and other impurities from the passages in the reversing heat exchanger is greatly improved in my invention by the fact that the nitrogen effluent which must remove those impurities enters the reversing heat exchanger at a sufficiently high temperature to assure substantially complete removal of those impurities and to insure against plugging of the passages by the accumulation of impurities. There is no loss in refrigeration occasioned by the preliminary heating of the nitrogen effluent because the refrigeration required to cool the air is supplied by the carrying over in the product oxygen line of a significant quantity of liquid which supplies the needed refrigeration to cool the air down sufficiently to guarantee substantially complete removal of impurities.

Other advantages will be apparent to those skilled in the art.

While there are in this application specifically described numerous forms which the invention may assume in practice, it will be understood that these forms of the same are shown for purposes of illustration, and that the invention may be modified and embodied in various other forms without departing from its spirit or the scope of the appended claims.

I claim:

1. In a method of separating oxygen from the remaining constituents of air by rectification in an oxygen generating system in which a plurality of fluids pass in thermal contact through a reversing heat exchanger, one of the fluids being raw compressed air and another being a nitrogen-rich product of the rectification, the improvement which comprises cooling the air by heat exchange with said nitrogen-rich product and by heat exchange with cold wet oxygen product in the form of a saturated mixture which is at least 25% liquid, said cooling reducing the air temperature sufficiently to accomplish substantially complete solidification of the carbon dioxide at the pressure then obtaining, reheating at least a portion of the air by passing it in thermal contact with a fluid after said fluid has passed through part of the reversing heat exchanger, expanding the reheated portion with the performance of external work, operating a rectification column to produce two products of rectification one of which is substantially pure oxygen and the other of which is rich in nitrogen, passing the oxygen product in a saturated mixture directly from the column to the reversing heat exchanger, preliminarily heating the nitrogen-rich product to a temperature at which it is warm enough to sublime solid carbon dioxide at the existing pressure of the nitrogen-rich product, and further heating the nitrogen-rich product in said reversing heat exchanger by heat exchange with the raw compressed air from said warm enough temperature to substantially room temperature.

2. In an oxygen generator: a reversing heat exchanger including a plurality of tubes bonded together throughout their length except that, at the cold end of the reversing heat exchanger, the tubes providing passage for a given fluid are not bonded to the remaining tubes; an expansion engine; a second heat exchanger; a rectification column having a nitrogen effluent outlet and means to discharge a wet oxygen product; means to supply compressed air to the reversing heat exchanger; means to conduct air from the reversing heat exchanger to said engine; means to conduct expanded air from the engine to the column; means to conduct a fluid from one portion of the column through the second heat exchanger to another portion of the column; means to conduct nitrogen effluent from said effluent outlet to the reversing heat exchanger, the last-named means including a passage through the second heat exchanger; and means to conduct wet oxygen product from said discharge means to the passage of the reversing heat exchanger which is formed by the tubes not bonded at their cold end to the remaining tubes.

3. In apparatus for the separation of gases: a source of an impure gaseous mixture under pressure; a reversing heat exchanger for the removal of impurities; a rectification column having an outlet for a wet saturated product mixture; means, including the reversing heat exchanger, to conduct gaseous mixture from the source to the column; means, including the reversing heat exchanger, to conduct waste gas from the column to the atmosphere; means, including the reversing heat exchanger, to effect heat exchange between the gaseous mixture and the product mixture; means to conduct product mixture from said outlet to the last-named means; means to conduct vaporized product from said heat exchange effecting means to a utilizer; and a heat dam in the cold end of the reversing heat exchanger to impede heat exchange between the product mixture and the gaseous mixture.

4. In apparatus for the separation of gases: a source of an impure gaseous mixture under pressure; a reversing heat exchanger for the removal of impurities, having a passage for impure gaseous mixture, a non-reversing passage for a cold fluid comprising at least a substantial percentage of liquid, a heat dam between said two passages at the cold end of the heat exchanger, and a third passage; a rectification column having a gaseous mixture inlet, a waste product outlet, and a desired product outlet; means, including the first-named reversing heat exchanger passage, to conduct gaseous mixture from the source to the column; means, including the third reversing heat exchanger passage, to conduct a column product from the column to the atmosphere; means to supply a cold fluid comprising at least a substantial percentage of liquid to the cold end of the second-named reversing heat exchanger passage; and means to conduct vapor away from the warm end of said second-named passage.

5. Apparatus as in claim 4, in which the means to conduct gaseous mixture from the source to the column, and the means to conduct a column product from the column to the atmosphere, include a heat exchanger to effect preliminary heating of the column product by cooling the gaseous mixture.

6. Apparatus as in claim 4, in which the means to supply a cold fluid includes a liquid separator.

7. Apparatus as in claim 4, in which the means to supply a cold fluid comprises a conduit connected with the desired product outlet of the column.

8. In a method of separating oxygen from the other constituents of air by rectification in an oxygen generating system in which a plurality of fluids pass in thermal contact through a reversing heat exchanger, one of the fluids being raw compressed air and another being a nitrogen-rich product of the rectification, the improvement which comprises cooling the air by heat exchange with said nitrogen-rich product and by heat exchange with oxygen product in the form of a saturated mixture which is at least 25% liquid, said cooling reducing the air temperature sufficiently to accomplish substantially complete solidification of the carbon dioxide at the pressure then obtaining, reheating at least a portion of the air by passing it in thermal contact with a fluid after said fluid has passed through part of the reversing heat exchanger, expanding the reheated portion with the performance of external work, operating a rectification column to produce two products of rectification one of which is substantially pure oxygen and the other of which is rich in nitrogen, passing the oxygen product in a saturated mixture directly from the column to the reversing heat exchanger, periodically reversing the flow of the compressed air and the nitrogen-rich product through the reversing heat exchanger, and increasing the heat content of the nitrogen-rich product prior to its passage through said reversing heat exchanger to thereby increase its capacity for absorbing carbon dioxide.

9. In a method of separating oxygen from the other constituents of air by rectification in an oxygen generating system in which a plurality of fluids pass in thermal contact through a reversing heat exchanger, one of the fluids being raw compressed air and another being a nitrogen-rich product of the rectification, the improvement which comprises cooling the air by heat exchange with said nitrogen-rich product and by heat exchange with oxygen product in the form of a saturated mixture which is at least 25% liquid, said cooling reducing the air temperature sufficiently to accomplish substantially complete solidification of the carbon dioxide at the pressure then obtaining, expanding at least a portion of the purified air with the performance of external work, operating a rectification column to produce two products of rectification one of which is substantially pure oxygen and the other of which is rich in nitrogen, passing the oxygen product in a saturated mixture directly from the column to the reversing heat exchanger, and periodically reversing the flow of the compressed air and the nitrogen-rich product through the reversing heat exchanger.

10. In a method of rectifying air to provide one component thereof as a substantially pure product in which a plurality of fluids pass in thermal contact through a reversing heat exchanger, one of the fluids being raw compressed air and another being a nitrogen-rich product of the rectification, the improvement which comprises cooling the air by heat exchange with said nitrogen-rich product and by heat exchange with cold wet oxygen product in the form of a saturated mixture containing a sufficient quantity of liquid whereby the combined cold content of the nitrogen-rich product and the oxygen product is sufficient to reduce the air temperature to accomplish substantially complete solidification of the carbon dioxide at the pressure then obtaining, expanding at least a portion of the purified air with the performance of external work, operating a rectification column to produce at least two products of rectification one of which is substantially pure oxygen and another of which is rich in nitrogen, passing the oxygen product in a saturated mixture directly from the column to the reversing heat exchanger, and periodically reversing the flow of the compressed air and the nitrogen-rich product through the reversing heat exchanger.

11. The method of rectifying air to provide at least one component thereof as a substantially pure product in which a plurality of fluids pass in thermal contact through a reversing heat exchanger, one of the fluids being raw compressed air and another being a nitrogen-rich product of the rectification, the improvement comprising cooling the air by heat exchange with said nitrogen-rich product and by heat exchange with cold wet oxygen product in the form of a saturated mixture containing a sufficient quantity of liquid whereby the combined cold content of the nitrogen-rich product and the oxygen product is sufficient to reduce the air temperature at the cold end of said reversing heat exchanger without additional refrigeration to accomplish substantially complete solidification of the carbon dioxide at the pressure then obtaining, expanding at least a portion of the purified air with the performance of external work, operating a rectification column to produce at least two products of rectification one of which is substantially pure oxygen and another of which is rich in nitrogen, passing the oxygen product in a saturated mixture directly from the column to the reversing heat exchanger, and periodically reversing the flow of the compressed air and the nitrogen-rich product through the reversing heat exchanger.

References Cited in the file of this patent

UNITED STATES PATENTS

| Number | Name | Date |
| --- | --- | --- |
| 2,116,191 | De Baufre | May 3, 1938 |
| 2,360,468 | Brown | Oct. 17, 1944 |
| 2,499,043 | Voorhees | Feb. 28, 1950 |
| 2,501,999 | Fausek | Mar. 28, 1950 |
| 2,502,250 | Dennis | Mar. 28, 1950 |
| 2,504,051 | Scheibel | Apr. 11, 1950 |
| 2,513,306 | Garbo | July 4, 1950 |
| 2,525,660 | Fausek | Oct. 10, 1950 |
| 2,550,679 | Engel | May 1, 1951 |
| 2,579,498 | Jenny | Dec. 25, 1951 |
| 2,586,811 | Garbo | Feb. 26, 1952 |
| 2,640,332 | Keyes | June 2, 1953 |
| 2,664,719 | Rice | Jan. 5, 1954 |
| 2,668,425 | Skaperdas | Feb. 9, 1954 |
| 2,673,456 | Scharmann | Mar. 30, 1954 |